Sept. 4, 1956 J. R. McKEE, JR 2,761,347
FASTENER AND COMPOSITE SEALING WASHER
HAVING A DEFLECTABLE LIP
Filed July 30, 1953 2 Sheets-Sheet 1

INVENTOR.
JOHN R. McKEE JR.
BY
Christy Parmelee & Strickland
ATTORNEYS.

Sept. 4, 1956  J. R. McKEE, JR  2,761,347
FASTENER AND COMPOSITE SEALING WASHER
HAVING A DEFLECTABLE LIP
Filed July 30, 1953  2 Sheets-Sheet 2

INVENTOR.
JOHN R. McKEE JR.
BY
Christy, Parmelee & Strickland
ATTORNEYS.

United States Patent Office 2,761,347
Patented Sept. 4, 1956

2,761,347

FASTENER AND COMPOSITE SEALING WASHER HAVING A DEFLECTABLE LIP

John R. McKee, Jr., Pittsburgh, Pa.

Application July 30, 1953, Serial No. 371,216

3 Claims. (Cl. 85—1)

This invention relates, as indicated, to a composite washer, and, more particularly, to a metal washer having a backing sheet of compressible resilient sealing material bonded thereto which will provide a leak-proof seal about the opening through which the fastening element used with the washer extends.

In the use of nails and threaded fasteners for securing purposes, the provision of washers affording a bearing surface for the head of the fastening element is universal. However, in many applications, it is desirable that the fastening connection be leak proof. This is particularly true of fastening connections for flat and corrugated metal sheets used in the fabrication of roofing structures, metal buildings, bulk commodity containers such as metal grain bins, liquid containers, and sheet metal structures generally. In such cases, the problem of preventing leakage in the area about the shank of the fastening element has been most troublesome, and various proposals have been made but have not provided a satisfactory solution.

This invention has, as one of its principal objects, the provision of a washer which will afford an improved seal about the opening through which the shank of the fastener used with the washer extends. The washer of this invention is of composite construction and is comprised of a metal backing member having a sheet or layer of compressible material bonded to and covering one side thereof. The compressible material is arranged concentrically of the metal backing member but has an inner diameter which is both smaller than the inner diameter of the metal back member and the minor diameter of the fastening element with which it is used. In this manner, there is provided, in effect, an annular lip of compressible material about the inner periphery of the metal backing member which is drawn by axial movement of the fastener into the opening through which it extends upon axial tightening movement thereof. The drawing or forcing of this annular lip of compressible material into the fastener opening is effective, in a manner to be described, to form a liquid and moisture proof seal about the fastener opening.

A further object of this invention is to provide a washer of shake-proof construction which can be assembled on a threaded fastener by an axial movement in one direction only of the washer over the fastener threads but can be removed in the opposite direction only by a rotational movement of the washer with respect to the threads.

Other objects and advantages of the invention will become apparent from the following description.

In the drawings, there are shown several embodiments of the invention. In this showing:

Figure 1:
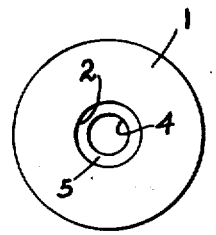
Fig. 1 is a plan view of a washer constructed in accordance with the principles of this invention.
Figure 2:
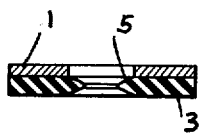
Fig. 2 is a sectional view taken along a diameter of the washer shown in Fig. 1.

Figs. 1 through 4 illustrate several forms of washers constructed in accordance with the principles of this invention. Referring to Figs. 1 and 2, the numeral 1 designates a metal disc or backing member having a central opening 2 therein. The diameter of the opening 2 is slightly larger than the major diameter of the fastener to be used therewith, and the area of the disc about the opening 2 provides a bearing surface for engagement with the head of a fastener as in conventional washers. A layer or sheet of compressive and resilient sealing material 3 covers and has a bonded connection with the under surface of the disc 1. The compressive material 3 has a central opening 4 arranged concentrically of the opening 2 which has an inner diameter substantially less than the minor diameter of the fastener to be used with the washer. In this manner, the central portion of the compressive material 3 projects inwardly of the periphery of the opening 2 and provides an annular lip 5 about the inner edge of the opening 2.

While the metal washer or backing member 1 illustrated in Figs. 1 and 2 is flat and has a circular contour, it will be understood that it may have a square or rectangular shape or a shape of any other desired configuration adapted to the surface of the structure with which it is to be used. Instead of a flat disc 1 as shown in Figs. 1 and 2, the metal disc or backing member may be crowned as at 1a in Fig. 3.

Figure 3:
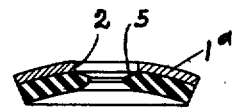
Fig. 3 is a view similar to Fig. 2 of a washer having a crowned or dished metal backing member.
Figure 4:
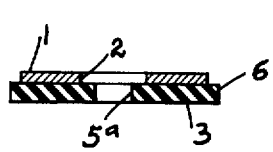
Fig. 4 is a view similar to Fig. 2 of a modified embodiment of the invention.

In Figs. 2 and 3, the annular lip 5 is illustrated as having a taper for a purpose to be described. In place of a tapered lip 5, the lip 5a may have a uniform thickness throughout its radial dimension and of the same thickness as the body of the material 3 as illustrated in Fig. 4. While the showings of Figs. 2 and 3 illustrate the outer edges of the material 3 as being flush with the outer edge of the washers 1 and 1a, the outer edge 6 of the material 3 may extend beyond the outer edge of the washer 1 as shown in Fig. 4.

The compressive material 3 may be rubber, either natural or synthetic, or any other material having proper resilient and compressible characteristics for providing a seal about the opening in a supporting structure through which the fastener extends, and has a bonded fastening connection extending over the entire surface thereof engaged with the under surface of the washer 1.

In the preferred practice of the invention, the material 3 is a rubber or rubber-like material having an intermediate layer of a composition bonding it to the disc 1 as described in greater detail in U. S. Patent No. 2,147,620 to H. A. Winkelman et al. to which reference is hereby made. However, it will be understood that any compressive or rubber-like materials and bonding compositions suitable for adhering such compressive materials to metal other than those mentioned in the patent referred to above are applicable to the principles of this invention.

Figure 5:
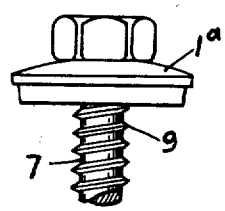
Fig. 5 is an elevational view illustrating the application of the washer shown in Fig. 3 to a threaded fastener.
Figure 6:
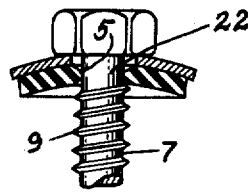
Fig. 6 is a view similar to Fig. 5 showing the washer in section.
Figure 7:
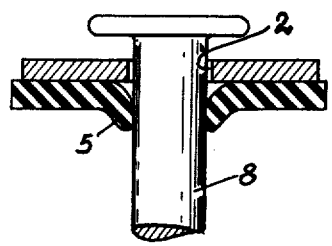
Fig. 7 is a fragmentary elevational view of a nail having a washer such as shown in Fig. 2 in position thereon.

As has been indicated above, the washer of this invention may be effectively used with any form of headed fastener such as the threaded fastener 7 illustrated in Figs. 5 and 6 or a nail 8 as shown in Fig. 7. The provision of the annular lip 5 projecting inwardly of the opening 2 provides a shake-proof washer construction by which the washer can be speedily applied to a fastening element but by which its removal accidentally is effectively prevented and its intentional removal is rendered more difficult. The washer may be applied to a fastening element 7 having a threaded shank by moving the washer axially upwardly to the position illustrated in Figs. 5 and 6 and during this movement the annular lip 5 will be stretched and moved over the threads 9. The stretching of the lip 5 in this manner during relative upward movement with respect to the fastener releases its frictional engagement with the fastener and enables the lip 5 to move easily over the threads with a stripping action. However, axial movement downwardly of the washer from the position shown in Figs. 5 and 6 is prevented by the lip 5 engaging with the threads 9, the threads 9 in such case operating to compress the lip 5 against the metal of the washer or metal backing member 1. Compression of the lip 5 in this manner increases its frictional engagement with the fastener. Removal of the washer from a threaded element 7 as shown in Figs. 5 and 6 can be effected only by rotating the washer to move the lip 5 downwardly over the threaded fastening element, the lip 5 following the threads in such case with a threading action.

A similar action is had when the washer is applied to a nail 8 having a smooth shank as illustrated in Fig. 7. While there are no threads to interfere with downward movement of the lip 5 in the case of a nail 8, the frictional engagement of the lip 5 with the shank of the nail will tend to move the lip 5 into the opening 2 thereby increasing its frictional engagement with the nail shank and its resistance to downward movement of the washer. The washer can be removed from a nail 8 only with difficulty by applying a simultaneous twisting action and a downward axial pressure to the washer, the twisting action in such case being effective to relieve the compression of the lip 5 in the opening 2 so as to enable continued downward movement of the washer relative to the nail.

Figure 11:
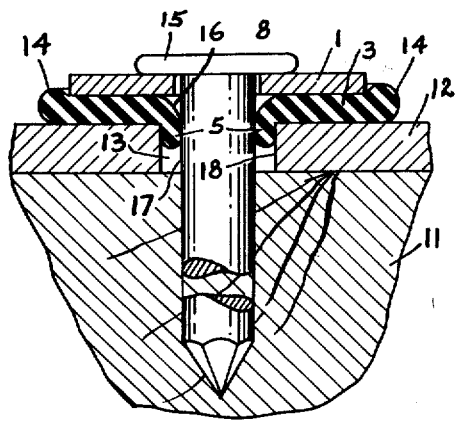
Fig. 11 is a sectional view illustrating the assembled position of a washer with respect to a nail.

The provision of the inwardly projecting annular lip 5 affords a further advantage with respect to providing a seal about the opening through which the fastening element extends. This sealing action is demonstrated by the showings respectively of Figs. 11 and 12. In Fig. 11, the nail 8 is illustrated as having been driven into a wooden support 11 for securing a sheet metal structure 12 such as sheet metal roofing in position thereon. From this showing, it will be noted that downward movement of the nail has drawn or pulled the lip 5 downwardly of the opening 13 in the metal plate 12 through which the nail 8 extends. In addition, it will be noted that the compressive material 3 has been bulged or extruded outwardly as at 14 to enhance the sealing action about the outer periphery of the washer 1. The nail 8 is shown in the position it occupies just prior to the final tightening blow against its head 15. When the final blow is applied to the head 15, the nail will move a further distance downwardly and effect a further compression of the compressive material 3. Such final movement will be effective to move the lip 5 further downwardly into the opening 13, and the compressive material will be further bulged or extruded to fill the space 16 to an amount depending upon the downward force applied.

The lip 5 will thus be effective to provide an extremely tight weather and moisture-proof seal about the shank 17 of the nail and about the inner surface 18 of the opening 13.

Figure 12:
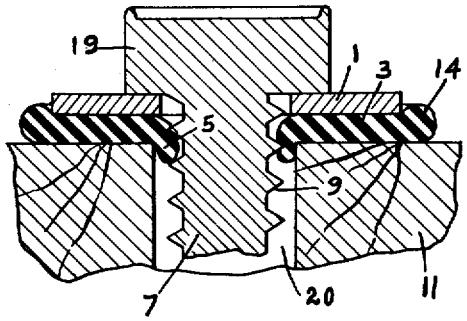
Fig. 12 is a view similar to Fig. 11 but illustrating the assembled position of the washer with respect to a threaded fastener.

A similar sealing action will be provided by the lip 5 in the case of the threaded fastening element 7 shown in Fig. 12. In this showing, the fastening element will have a nut (not shown) provided on its lower end for securing a plate (not shown) to the underside of the supporting structure 11. Rotation of the head 19 to move the washer downwardly forces the lip 5 downwardly into the opening 20 through which the shank of the fastener extends and provides a seal about the surface of the opening 20. Fig. 12, similar to Fig. 11 shows the relative positions of the parts just prior to final tightening movement. In this position, the compressive material 3 is bulged outwardly at 14 and the lip 5 has had imparted to it an initial downward movement into an opening 20. Final downward tightening movement of the fastener 7 will be effective to move the metal disc 1 downwardly and the compressive material 3 will be bulged or extruded still more to fill the space in the opening 20 about the surfaces of the threads and the minor diameter of the threaded shank within the opening 20 and thus provide a tight seal about the outer surface of the shank 7 as well as a tight seal about the inner surface of the opening 20.

In connection with the showings of Figs. 11 and 12, it will be understood that these showings are presented solely for the purpose of illustrating the principles of the invention and that the invention is applicable to any form of fastening operation where a weather-proof and moisture-proof seal is desired about the opening through which the fastening element extends. Although Fig. 12 shows the fastener 7 as extending through a preformed opening 20, it will be understood that the same principles apply, for example, where the threaded element 7 is engaged with the threads of a threaded opening. In such case the threads 9 draw the lip 5 into the space between the threads 9 and the threads of the opening in which the fastener is engaged. Where the threads of the fastener are engaged with the threads of a threaded opening, it is necessary that the compressive material 3 be an extremely tough material which will not tear or shear easily such as the synthetic rubber materials marketed under the name "neoprene."

The sealing action of the compressive material as described in connection with Figs. 11 and 12 will be had with an inwardly projecting lip 5 having either the tapered construction illustrated in Figs. 2 and 3 or a lip 5a which does not have a taper of this nature as illustrated in Fig. 4. However, an improved sealing action is provided by the tapered lip 5 as compared to the non-tapered lip 5a since the taper improves the tendency of training and stretching the lip into the opening to be sealed. In addition, the tapered lip 5 improves the ability of the lip to follow the threads of a threaded fastener as compared to a non-tapered lip 5a in a manner to be referred to.

Figure 8:
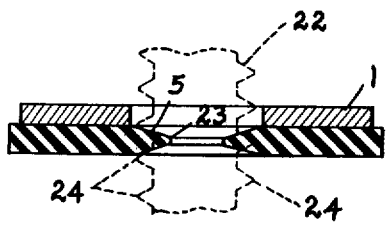
Fig. 8 is an enlarged sectional view similar to Fig. 2 showing the relative size of the inner diameter of the washer with respect to the minimum diameter of a threaded fastening element.

As has been indicated above, it is preferred that the inner diameter of the lip 5 or 5a be smaller than the minor diameter of the fastening element regardless of whether the fastening element is threaded or not. The inner diameter of the lip 5 or 5a is made smaller than the minor diameter of the threaded fastening element in order to insure a snug fit of the lip on the shank of the fastening element, and this is essential in order to obtain the shake-proof and sealing features referred to above. The extent to which the minor diameter of the fastener exceeds the inner diameter of the lip 5 is illustrated in Fig. 8 wherein the dotted lines 22 designate the contour of a threaded fastening element. From this showing, it will be noted that the tip 23 of the lip 5 extends a substantial distance inwardly of the minor diameter of the fastener 22 at the base of its threads 24. While the inner diameter of the lip 5 at the tip 23 may be made still smaller, a diameter of the character indicated will be found satisfactory. If the inner diameter at the tip 23 is made much larger than indicated in this showing, the effectiveness of the sealing and shake-proof features of the washers will be diminished. As an example of comparative dimensions, a washer for a #14 hex head screw having a minor diameter of .185" to .192" and a major diameter of .240" to .246" should have an inner diameter of from about .110" to about .160", and preferably an inner diameter of about .145". The same washer would be used on a nail having a shank diameter of about .240" or approximately the same diameter as the major diameter of a #14 screw.

The axial thickness of the compressive material particularly in the region of the tip 23 of the lip 5 is limited by the pitch of the threaded fastener on which it is to be used. As indicated in Fig. 8, the thickness of the lip 5 at the tip 23 is substantially less than the pitch between adjacent teeth 24 so that the tip 23 will easily enter the space between the adjacent teeth 24 and will thus follow such threads with a threading action when the washer is rotated relatively to the fastener. Where the lip 5 is tapered, its thickness increases from a minimum at its inner periphery to the maximum thickness of the sheet 3 at its outer periphery which coincides with the periphery of the plate opening 2. For a #14 screw having a thread pitch of about .071", the compressive material 3 may have a body thickness in an axial direction of .078" to about .0937", and is tapered to a thickness of about .020" to about .035" at the tip 23 of the lip 5. In the case of a washer having a uniform axial thickness throughout its radial dimension and a square lip 5a as in Figs. 4 and 10, the thickness of the material 3 should be about .050". While washers may be used having a thickness at the tip 23 of the lip 5 or 5a exceeding the dimensions indicated above, greater thicknesses will be found to interfere with the ability of the lip to follow the threads since the lip will then span the distance between the outer points of adjacent teeth 24. While washers used with nails may utilize backing members 3 having a slightly greater axial thickness, it is preferred that the thickness be of the nature explained above in connection with threaded fasteners since increasing the thickness will interfere with training the lip 5 into an opening as illustrated in Fig. 11.

In the case of the fastener shown in Fig. 12, it will be noted that the threads extend to a point adjacent the head 19 whereas in Fig. 7 the threads terminate short of the head providing an unthreaded shank portion 22. The shank portion 22 has a diameter which is only slightly larger than the minor diameter of the lip 5, and, although it is larger than the inner diameter of the lip 5, the washer may be rotated easily about the unthreaded portion 25 thereby affording a shake-proof washer having a free-spinning effect when the washer is in the position shown in Fig. 7.

Figure 9:
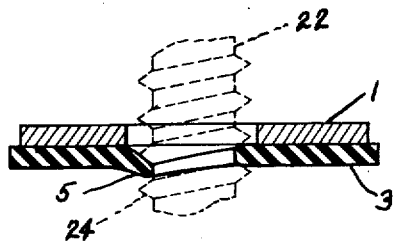
Fig. 9 is a view showing the manner in which the annular lip on the washer sealing member follows and has threading engagement with the threads of a fastener to which it is applied.
Figure 10:
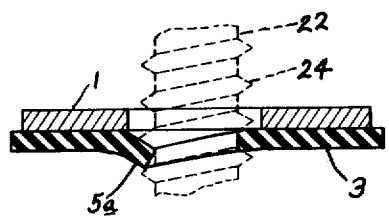
Fig. 10 is a view similar to Fig. 9 but illustrating a washer as shown in Fig. 4.

The manner in which the inwardly projecting lip 5 or 5a follows the threads of a fastener is shown in Figs. 9 and 10. In this showing, the numeral 22 designates a fastener having threads 24 as in Fig. 8 referred to above. Referring to Fig. 9, it will be noted that the portion of the lip 5 at the left of the fastener has been pulled downwardly by one of the threads 24 but that the portion of the lip to the right follows the thread immediately above about the minor diameter of the fastener. A similar action is had with the washer having a non-tapered lip 5a as shown in Fig. 10 although the thread following action in this case is not as precise as with the tapered lip 5 of Fig. 9. However, it will be apparent from these figures that a washer having either a tapered lip 5 or a non-tapered lip 5a will move axially upon rotation of the washer relative to the threaded fastener in a manner similar to a nut having threaded engagement therewith.

In the preferred practice of the invention, as indicated above, the backing member 1 is a rigid metal disc. However, it is to be understood that the backing member or plate 1 may be fabricated of rigid and inflexible materials other than metal to which the layer of flexible and compressible material 3 may be adhered or secured. For example, the backing plate 1 may be fabricated from a hard vulcanized fiber material, Bakelite, phenolic polyester resins, or other similar materials having the desired rigid and inflexible characteristics.

From the foregoing, it will be apparent that the washer of this invention comprising the rigid backing member 1 having a layer 3 of compressible material bonded thereto provides both an effective seal about an opening through which the fastener used therewith extends and an improved engaging action with the fastener. Attention is particularly directed to the fact that the inwardly projecting lip 5 or 5a not only is effective in providing a seal about a fastener opening, but provides a novel form of shake-proof engagement of the washer on a fastener which, in the case of a threaded fastener, further enables rapid assembly of the washer on the fastener.

While the drawings and above description illustrate and describe a preferred embodiment of the invention, it will be understood that this is merely by way of illustration, and that various changes and modifications may be made therein within the contemplation of the invention and under the scope of the following claims.

I claim:

1. A composite sealing element mounted on a fastener having a head portion and a shank portion, comprising a substantially flat backing member having a central opening extending therethrough of a diameter greater than the fastener shank portion and smaller than the head portion, said backing member having one face thereof providing a bearing for the fastener head portion, a resilient rubber like sealing member of substantially uniform thickness extending substantially coextensive with said backing member and bonded to the opposite face of the backing member, an opening extending through said sealing member concentric with the backing member opening and of a diameter less than that of the backing member opening and that of the fastener shank received therein, said sealing member forming an unbonded lip portion underlying the backing member opening and extending inwardly from the periphery of the backing member opening, said sealing member lip portion tapering from the periphery of the backing member opening to the periphery of the sealing member opening and providing an annular resilient portion deflected axially of the fastener shank below the adjacent body of the sealing member, which deflected annular portion grips the said shank and is substantially uniformly carried into an opening receiving the fastener shank forming an annular seal about the fastener shank within said opening therefor.

2. A sealing self-tapping screw threaded fastener for connecting a first member to a second member comprising a threaded shank portion, a head portion integral with and larger in diameter than the shank portion for rotation thereof to cut threads in preformed openings of said first and second members, a substantially flat metal bearing member having one face in bearing engagement with said head portion and provided with a central opening therethrough larger than the said fastener shank portion disposed therein, a rubber like resilient sealing member of substantially uniform thickness extending substantially coextensive with said bearing member and bonded to the other face of the metal bearing member spacing the bearing member from said first member, a central opening through said sealing member concentric with the metal bearing member opening and of a diameter smaller than the bearing member opening and the outside diameter of the threads of the fastener shank therein to form an unbonded annular lip portion extending inwardly of the bearing member opening, said lip portion tapering towards the sealing member opening and being deflected axially of the fastener shank as the bearing member is moved axially of the shank into engagement with the said fastener head portion, said deflected tapered sealing member lip portion gripping the threaded shank and carried thereby into an opening in the first member receiving the threaded shank to provide a substantially uniform annular seal between the threads of the fastener shank and the threads cut thereby in the opening of the first member receiving said shank.

3. A screw threaded fastener comprising a threaded shank extending through an upper structural member and engaging within and cutting threads in a base structural member, a head on said shank for turning same and for holding the upper structural member against said base structural member, a substantially flat metal washer on said shank providing a bearing surface for said head, said metal washer having an opening therein larger than the diameter of said shank, a resilient rubber sealing washer of substantially uniform thickness bonded substantially coextensively to the under face of said metal washer and spacing the metal washer from said upper structural member, said rubber sealing washer having an opening therethrough concentric with said metal washer opening and of a diameter smaller than the adjacent diameter of the fastener shank providing an annular unbonded lip extending inwardly of said metal washer opening and deflected axially of said fastener shank in gripping relation therewith, said lip having at least one face thereof tapering from the metal washer opening to the rubber sealing washer opening and carried by said shank into the opening of the upper structural member forming an annular substantially uniform seal therein about the shank.

References Cited in the file of this patent
UNITED STATES PATENTS

| | | |
|---|---|---|
| 2,097,713 | Ashley | Nov. 2, 1937 |
| 2,273,380 | Searles | Feb. 17, 1942 |
| 2,336,913 | Albrecht | Dec. 14, 1943 |
| 2,436,323 | Nygard | Feb. 17, 1948 |
| 2,643,904 | Wehmanen | June 30, 1953 |
| 2,706,656 | Roubal | Apr. 19, 1955 |
| 2,718,691 | Sussenbach | Sept. 27, 1955 |

FOREIGN PATENTS

| | | |
|---|---|---|
| 168,094 | Great Britain | Aug. 15, 1921 |